United States Patent [19]
Dehlke

[11] Patent Number: 6,042,313
[45] Date of Patent: Mar. 28, 2000

[54] BLIND RIVET

[75] Inventor: Klaus Dehlke, Haag, Germany

[73] Assignee: Richard Bergner GmbH & Co., Germany

[21] Appl. No.: 09/124,215

[22] Filed: Jul. 29, 1998

[30] Foreign Application Priority Data

Jul. 29, 1997 [DE] Germany .......................... 197 32 517

[51] Int. Cl.[7] .............................. F16B 13/04; F16B 13/06
[52] U.S. Cl. .................. 411/43; 411/48; 411/70
[58] Field of Search ................................ 411/43, 45, 46, 411/48, 69, 70

[56] References Cited

U.S. PATENT DOCUMENTS

| 3,515,028 | 6/1970 | Patton ........................................ 411/70 |
| 4,208,943 | 6/1980 | Smith ..................................... 411/43 X |
| 5,006,024 | 4/1991 | Siegol .................................... 411/70 X |
| 5,106,249 | 4/1992 | Janotik ...................................... 411/43 |

FOREIGN PATENT DOCUMENTS

| 2057809 | 7/1971 | Germany . |
| 2613915C2 | 10/1976 | Germany . |
| 3035867C2 | 4/1981 | Germany . |
| 3119503C2 | 2/1982 | Germany . |
| 8327405 | 5/1984 | Germany . |
| 3521653C2 | 1/1986 | Germany . |

OTHER PUBLICATIONS

Avdel Verbindungselemente GmbH's HEMLOK® Brochure, 00/00.

Titgemeyer Brochure: Huck Magna–Bulb Blindniere, 00/00.

*Primary Examiner*—Neill Wilson
*Attorney, Agent, or Firm*—Venable; George H. Spencer; Robert Kinberg

[57] ABSTRACT

To produce a blind-rivet connection in which the rivet shaft (7) breaks off flush with the set-head (4) of the blind rivet (1), regardless of the total thickness (G) of the components (21) to be riveted, a blind rivet (1) is proposed whose rivet shaft (7) is provided with a plurality of break-off grooves (13) arranged axially in series. The tension segment (12) of the rivet shaft (7) is always separated at the break-off groove (13a) that is flush with the set-head end (11) after the rivet shank (2) has buckled to form a closing head (27).

15 Claims, 8 Drawing Sheets

BLIND RIVET

BACKGROUND OF THE INVENTION

The invention relates to a blind rivet as defined in the preamble to claim 1. The invention further relates to a method of producing a blind-rivet connection as defined in the preamble to claim 12.

A generic blind rivet is known under the brand name HEMLOK® from the catalogue 125.10101.88(00.00) of Avdel Verbindungselemente [Connecting Elements] GmbH. To produce a blind-rivet connection, the rivet shank of the known blind rivet is inserted into a flush bore of a plurality of components whose surfaces rest against one another until the set-head lies on the component surface. After the blind rivet has been inserted, the rivet shaft is tension-loaded counter to the insertion direction. The setting tool that produces the blind-rivet connection is supported on the set-head of the blind rivet. The widened shaft head transmits the tension loading of the rivet shaft onto the free end of the rivet shank, which projects beyond the surface of the components remote from the set-head. Because of the mechanical pressure on the rivet shank, the shank is deformed into a so-called closing head. The components to be riveted are now clamped between the set-head, on the one hand, and the closing head, on the other hand, and thus fixed to one another. In the known blind rivet, the shaft head pushes the free end of the rivet shank ahead of itself to form the closing head. This leads to a folding of the rivet shank. The closing head therefore has the shape of an annular ring. When the closing head is completely formed, the mechanical tension acting inside the rivet shaft increases abruptly. This causes the rivet shaft to break off at a break-off groove provided at a defined distance from the shaft head for this purpose. If the known blind rivet is used to rivet components having a varying total thickness, the rivet shaft is always separated in a different position with respect to the set-head end as a function of the respective component thickness. This is undesirable for visual as well as stability reasons. Furthermore, no mechanism for stopping the shaft remaining in the rivet shank against the set-head is provided in the known blind rivet. Particularly in dynamic stressing, this leads to instability of the known blind rivet, because the residual shaft only counteracts expansion of the rivet shank caused by frictional wear, or in transversal contraction of the rivet shank.

A further blind rivet of the aforementioned type is known under the name HUCK® MAGNA-BULB from the catalogue TITGEMEYER 0292 Tb1012 of GEBR. [Brothers] TITGEMEYER GmbH & Co KG. In this blind rivet, the shaft head has an annular projection that is formed onto the casing of the rivet shaft with spacing from the end of the shaft head. At a defined distance from the shaft head, the rivet shaft is again provided with a break-off groove. Moreover, a notch whose edge facing the shaft head projects radially beyond the edge remote from the shaft head to form a stop is provided between the break-off groove and the shaft head. With the MAGNA-BULB system, the closing head is again formed through the folding of the rivet shank into an annular ring. Here, however, the increase in tension that occurs following the formation of the closing head does not lead directly to the breaking off of the rivet shaft at the break-of point. Instead, the annular projection of the shaft head breaks off first. The annular projection is displaced toward a knurling provided at the end of the shaft head, which fixes the annular projection. In the MAGNA-BULB system, the rivet shaft does not break off at the break-off point until, with continuous pulling at the rivet shaft, the stop provided there is pressed against a corresponding stop of the rivet shank. The stops are arranged such that the rivet shaft is always separated flush with the set-head end. When seat-head material is pressed into the notch of the rivet shaft, the rivet shaft is simultaneously fixed to the set-head. A disadvantage, however, is that the rivet shaft and rivet shank are only fixed on the closing-head side through frictional lockup. This frictional-lockup connection is gradually relaxed in dynamic stressing, in particular, which leads to a worsening of the rivet connection.

In addition, the rivet-shaft material at the break-off edge of the annular projection is especially susceptible to corrosion. Because this break-off edge lies inside the annular shank, the danger exists of uncontrollable internal corrosion.

DE-PS 35 21 653 discloses a blind rivet whose rivet shaft is provided with a plurality of adjacent break-off grooves arranged axially in series. The set-head of the known blind rivet is embodied as an oblong sleeve that is widened in the region adjoining the rivet shank to form an approximately annular retaining collar. Starting from the retaining collar, the outer diameter of the sleeve-like set-head tapers approximately conically toward the set-head end. To produce the rivet connection, in the known blind rivet a setting tool having a tubular mouthpiece is used, which is pushed coaxially onto the sleeve-shaped set-head until the set-head rests in a form-fitting connection against the inside wall of the mouthpiece. The increase in tension that occurs after the closing head is formed effects a further displacement of the mouthpiece with respect to the sleeve-like set-head, with the set-head material being deformed radially inwardly. The set-head material thus fills the break-off grooves of the rivet shaft inside the set-head, thereby locking the rivet shaft with the set-head. The further increase in tension occurring as the mouthpiece impacts the wide retaining collar effects the breakage of the rivet shaft at a break-off groove ending approximately flush with the set-head end. The known blind rivet has the disadvantage that the sleeve-like set-head is forced to project far beyond the component surface. The known blind rivet can therefore only be used generally at inaccessible component surfaces, since the projecting set-head poses an injury threat for persons or a damage threat for adjacent objects, particularly at a component surface that is moved. A further disadvantage of the known blind rivet is that the mouthpiece is exposed to large radial forces during the pressing process. These radial forces, which act perpendicular to the tension direction, lead to a high material stress within the setting tool.

In a blind rivet known from DE-GM 83 27 405, the shaft head is hollow. The formation of the closing head is not effected by folding, but by a radial widening of the rivet shank. The hollow shaft head is simultaneously compressed and drawn, at least partially, into the rivet shank. Similarly to the MAGNA-BULB system, a flush breakage of the rivet shaft and an axial fixing of the residual shaft are assured by corresponding stops at the set-head and rivet shaft. A disadvantage of this arrangement is that, particularly with dynamic stressing, the rivet shank and the hollow shaft head are deformed in an inelastic manner. As a result, the rivet connection gradually relaxes. A further disadvantage of the known blind rivet is that its cross section does not completely fill the bore provided in the components because of the hollow shaft head drawn into the rivet shank. This impairs the stability of the rivet connection under shearing stress.

SUMMARY OF THE INVENTION

It is therefore the object of the invention to improve a blind rivet of the above-described type. A further object is to provide a method of producing an improved blind-rivet connection.

In accordance with the invention, this object is accomplished, with respect to the blind rivet, by a rivet shaft having a plurality of break-off grooves that are arranged axially in series and constrict the diameter of the rivet shaft. The break-off grooves are disposed at the rivet shaft such that, when the closing head is formed and the rivet shaft has consequently been displaced in the direction of the set-head, one break-off groove is always flush with the set-head end. Because numerous break-off grooves are disposed one behind the other, it is always particularly simple to separate the rivet shaft flush with the set-head end, regardless of the total thickness of the components to be riveted. This blind-rivet characteristic is advantageously independent of the embodiment of the shaft head. The shaft head can therefore be embodied differently so that it can be adapted to the respective intended use of the blind rivet. In particular, the closing head can be formed both by folding and widening of the rivet shank. The rivet connection formed by the blind rivet only includes a single, freely-accessible break-off point, which reduces the risk of corrosion—particularly the risk of internal corrosion. In accordance with the invention, the set-head and the rivet shank essentially form a T-shape. T-shape is to be understood as any shape in which the set-head is flat, that is, the distance between the set-head end and the rivet shank is smaller than the outer diameter of the rivet shank, and a support surface that is approximately perpendicular to the rivet shaft is embodied at the set-head end as a stop for the mouthpiece cf a setting device. Because of the flat T-shape, the set-head projects only slightly beyond the component surface, which avoids the risk of injury at the riveted component surface. In this connection, it is particularly advantageous that the set-head is shaped like a section of a sphere, i.e., possesses a convex curvature, or, the set-head is embodied as a countersunk head. In this way, the set-head and the contiguous component form a virtually smooth surface.

In a preferred embodiment, the shaft head is dimensionally stable, and is in a form-fitting connection with the free end of the rivet shank. Because the shaft head is dimensionally stable, it remains unchanged during the riveting process. In particular, the stable formfit between the shaft head and the rivet shank is also retained when the closing head is formed. An especially stable rivet connection, particularly with respect to shearing stress, is attained by use of a rivet having a solid (not hollow) rivet shaft.

According to another preferred embodiment, the groove depth, that is, the difference between the outer radius of the rivet shaft and its break-off radius in the region of each break-off groove, preferably increases in the direction of the shaft head from break-off groove to break-off groove. In other words, the break-off groove next to the shaft head is the deepest notch, with the depth of the notch decreasing with each successive break-off groove. This effectively prevents the rivet shaft from breaking off at a break-off groove that projects beyond the set-head end, which would be undesirable. The same advantage is additionally or alternatively achieved with an arrangement of break-off grooves whose rounding radius in the angle point decreases from break-off groove to break-off groove in the direction of the shaft head. The break-off grooves thus have increasingly sharp edges in the direction of the shaft head. With such a sharp-edged break-off groove, a high notch effect, i.e., a high force concentration, is attained in the angle point of this break-off groove, which has a beneficial effect on a break-off of the rivet shaft at this location. The same effect is also attained with an arrangement of break-off grooves in which the opening angle of the break-off grooves decreases from break-off groove to break-off groove in the direction of the shaft head, that is, the break-off grooves become increasingly narrow in the direction of the sheift head.

According to another preferred embodiment, the break-off grooves are disposed at the rivet shaft such that, following the riveting process, that is, after the closing head has been formed, at least one break-off groove is located within the set-head. Through the pressing of set-head material into this break-off groove, the rivet shaft can advantageously be fixed to the set-head in the manner of an undercut. This break-off groove thus integrally fulfills the function of a fixing groove. A decisive advantage of the invention is that each break-off groove can serve as a fixing groove. There are therefore numerous possible arrangements for the rivet shaft with respect to the set-head that permit mutual locking. In this way, even with a varying total thickness of the components to be riveted, the form-fit between the rivet shaft and the set-head is always produced in the same position with regard to the set-head.

In an advantageous embodiment, the set-head has at its end a flow region, which is deformed under a relatively small pressing force. The ability of the flow region to be easily deformed can be the result of both a suitable geometry of the set-had in the flow region and a corresponding handling of the set-head material in the flow region. For example, the set-head can be soft-annealed in the flow region through a partial heat treatment.

In addition or alternatively to a closing region embodied in one part with the set-head, a pressing sleeve surrounds the rivet shaft coaxially and, following the pressing process, provides a particularly stable form-fitting connection between the rivet shaft and the set-head. In this embodiment, the blind rivet can be produced at an especially low cost. In addition, in otherwise structurally-identical components, the blind rivet can be adapted easily to different requirements; through the simple exchange of the pressing sleeve.

With regard to the method, the object is accomplished by pulling the tension segment of the rivet shaft with a setting tool placed essentially flat with its mouthpiece against the support surface, which is perpendicular to the rivet shaft, at the set-head end of the blind rivet. After the closing head has been formed, the set-head is deformed by the axial force transmitted from the mouthpiece onto the set-head such that the set-head material is pressed into at least one break-off groove inside the set-head. Afterward, the rivet shaft is separated at a break-off groove that is aligned with the set-head end.

With the method, it is always possible for the residual shaft to end flush with the set-head end and be locked at the set-head, regardless of the total thickness of the components to be riveted. This ensures a particularly good carrying capacity of the rivet connection, especially if the entire axial length of the rivet shank is filled with the residual shaft. Furthermore, the method reduces the susceptibility of the rivet connection to corrosion. The method advantageously permits the use of a blind rivet having a flat set-head that forms a T-shape with the rivet shank. A special advantage of the method is that the mouthpiece of the setting device is only exposed to axially-acting forces. Therefore, the force applied for setting the rivet connection is particularly advantageously converted for producing the rivet connection. In particular, no radial forces, or only small radial forces, are exerted on the mouthpiece of the setting device.

The pressing process advantageously fulfills a dual function. On the one hand, the rivet shaft is fixed against a motion in the insertion direction, and thereby prevents a gradual relaxation of the rivet connection. On the other hand, the pressed-in set-head material relieves the tension on the residual shaft located behind the press-in site. In this way, it is especially simple to break off the rivet shaft at the break-off groove that ends flush with the set-head end, and is therefore directly contiguous to the pressing site.

In accordance with another preferred method, the time of the pressing process is advantageously established relative to the formation of the closing head and the quantity of set-head material that is pressed in by the force necessary for pressing. This pressing force is determined by the material characteristic of the set-head material, as well as by the shape of the flow region or the pressing sleeve. Through a variation of the time of the pressing process, the rivet connection can be adapted especially well to the relevant objective. In particular, the maximum tension with which the rivet connection acts on the components can be set through such a variation.

Additionally or alternatively to this, the time of the pressing process and the quantity of set-head material that is pressed in are set by means of an exchangeable mouthpiece of the setting tool that produces the rivet connection. This is especially advantageous if the characteristics of the rivet connection can be varied independently of the embodiment of the blind rivet. For example, to rivet pressure-sensitive materials, a mouthpiece can be used that initiates the pressing process at a comparatively early time relative to the formation of the closing head, and thus severely limits the pressure exerted by the rivet connection on the components. Locking the shaft head with prestressing increases the stability of the rivet connection.

Among the advantages attained with the invention is that the residual shaft ends flush with the height of the set-head end without either a complicated reshaping mechanism when the closing head is formed or a complicated shaft head that can be reshaped. Furthermore, a plurality of commercially available blind rivets can be retrofitted with the intended breaking function of the invention, because this function is independent of the type and manner of the closing-head formation. In an especially advantageous embodiment, the blind-rivet connection includes a residual shaft which, in addition to the flush end, is fixed in a form-fitting connection to both the set-head and the closing head, and therefore penetrates the rivet shank in the manner of a tension rod. In this way, with the blind rivet of the invention, a blind-rivet connection can be produced that has an unusual stability under static as well as dynamic stress.

BRIEF DESCRIPTION OF THE DRAWINGS

Embodiments of the invention are described in detail below in conjunction with the drawings. Shown are in.

DETAILED DESCRIPTION OF THE INVENTION

Figure 1:
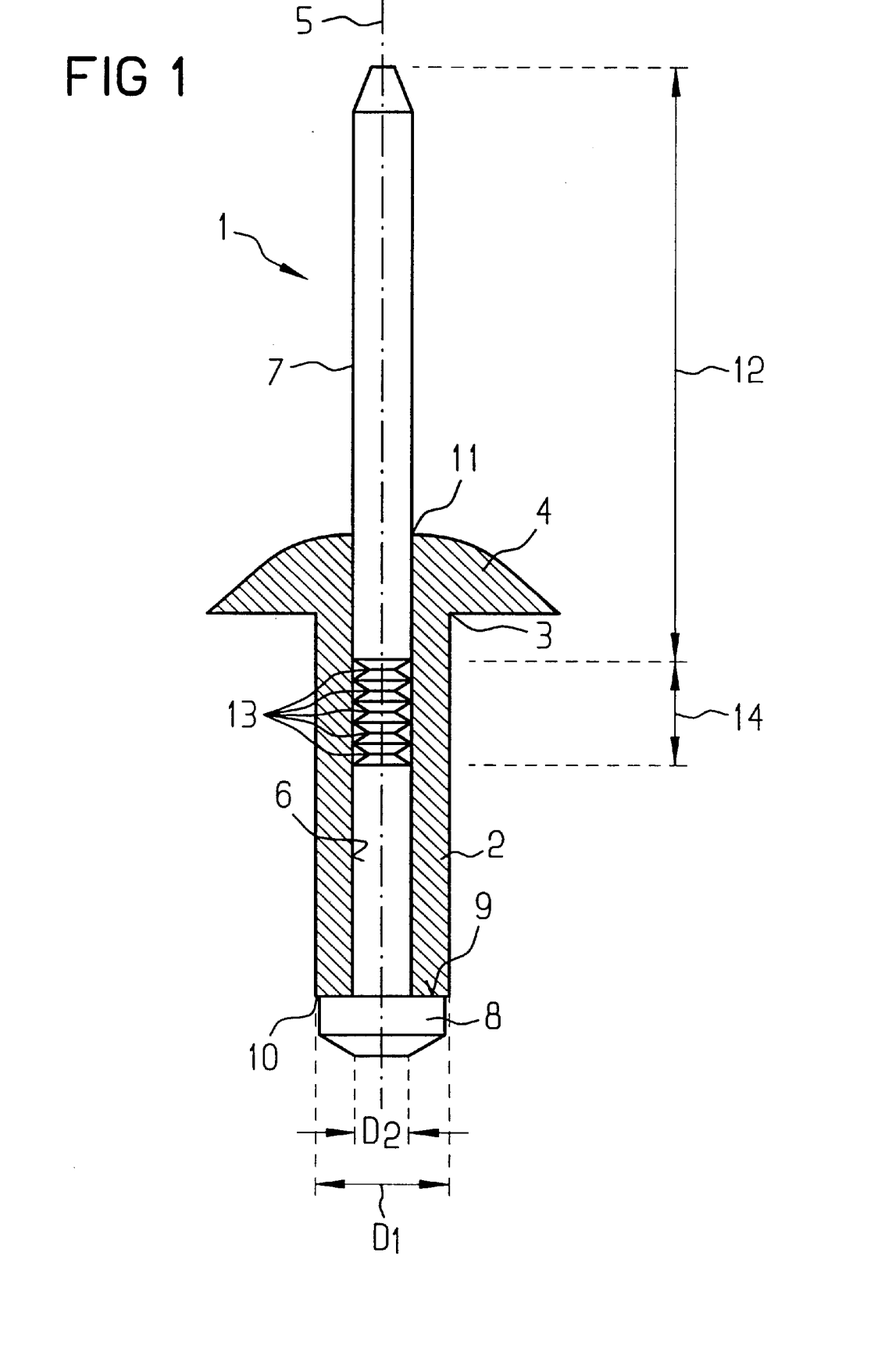
FIG. 1 a longitudinal section through a blind rivet in its initial state.

The blind rivet 1 shown in FIG. 1 includes an essentially hollow-cylindrical rivet shank 2, which, at a longitudinal end 3, is embodied in one piece with a set-head 4 that is widened in comparison to the outer diameter $D_1$ of the rivet shank 2. In the illustrated cross-section, the rivet shank 2 and the set-head 4 essentially form a T-shape. The set-head 4 is flat, that is, the distance between the set-head end 11 and the longitudinal end 3 is small in comparison to the outer diameter of the set-head 4. The outer diameter of the set-head 4 is preferably at least twice as large as the aforementioned distance. The set-head 4 is rounded on its side remote from the rivet shank 2, so it essentially has the shape of a sphere section (or sphere segment). The rivet shank 2 and the set-head 4 are penetrated by a bore 6, in which a rivet shaft 7 is inserted with a form-fit, the bore being coaxial to the longitudinal axis 5 of the blind rivet 1. The rivet shaft 7 is widened at its longitudinal end remote from the set-head 4 to form a shaft head 8, whose annular support surface 9 lies in a form-fitting connection against the free end 10 of the rivet shank 2 and perpendicular to the longitudinal axis 5. The diameter of the shaft head 8 approximately corresponds to the outer diameter $D_1$ of the rivet shank 2, and thus exceeds the inner diameter $D_2$ of the shank. A tension segment 12 of the rivet shaft 7 projects beyond the set-head end 11 opposite the free end 10, in the direction of the longitudinal axis 5. The rivet shaft 7 is provided with a plurality of break-off grooves 13 in the direction of the shaft head 8, axially adjoining the tension segment 12. The break-off grooves 13, which constrict the rivet shaft 7 in annular fashion, adjoin one another axially in close succession. In the initial state of the blind rivet 1 shown in FIG. 1, the groove section 14 occupied by the break-off grooves 13 is located completely inside the rivet shank 2.

FIGS. 2 through 6 illustrate the production of a blind-rivet connection by means of the blind rivet 1. In accordance with FIG. 2, the rivet shank 2 of the blind rivet 1 is inserted along an insertion direction S into a flush bore 20 of two components 21 to be riveted. Afterward, a setting tool 22 for producing the blind-rivet connection is placed against the blind rivet 1 such that the setting tool 22 lies against the set-head end 11 with its mouthpiece 23, which surrounds the rivet shaft 7 with spacing. The surface of the set-head 4 that rests against the mouthpiece 23 in the region of the set-head end 11 is identified as support surface A. This support surface A lies in a plane perpendicular to the rivet shaft 7, so the force transmission from the mouthpiece 23 to the set-head 4 occurs parallel to the rivet shaft 7, and thus parallel to the insertion direction S. The tension segment 12 of the rivet shaft 7 is fixed with positive lockup in a clamping device 24 of the setting machine 22.

Figure 3:
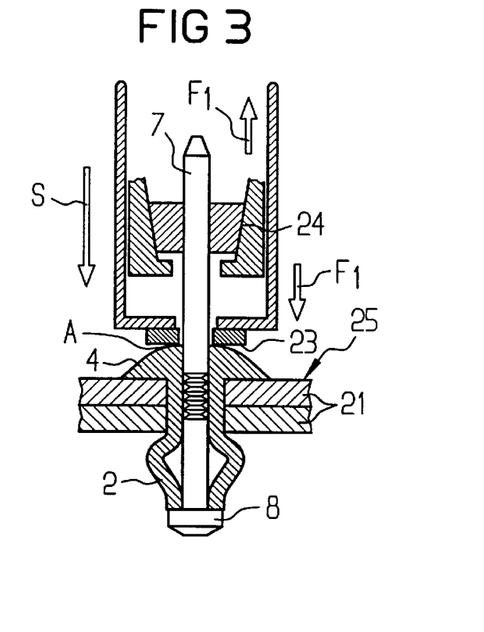

During the actual riveting process in accordance with FIG. 3, the mouthpiece 23 and the clamping device 24 are pressed apart with an axially-acting force $F_1$. In the process, the mouthpiece 23 is supported on the set-head 4, and thereby presses the set-head against the insertion side 25 of the components 21. The clamping device 24 displaces the rivet shaft 7 counter to the insertion direction S, with the shaft thereby effecting an annular-ring-type deformation of the rivet shank 2 by means of the shaft head 8 impacting the free-end side of the rivet shank 2.

Figure 4:
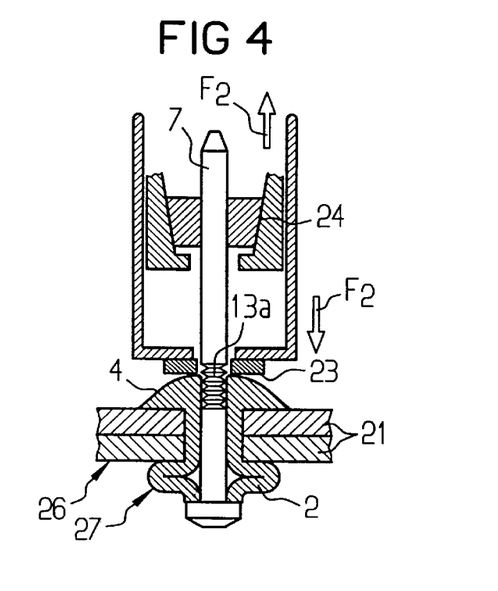

This annular-ring-type deformation of the rivet shank 2 is illustrated in the completed state in FIG. 4. Here the deformed rivet shank 2 lies with its surface against the rear side 26 of the components 21 opposite the insertion side 25. The components 21 are therefore fixed between the set-head 4 and the annular-ring-like deformation of the rivet shank 2 referred to as the closing head 27. The rivet shaft 7 is displaced, with respect to the rivet shank 2 and the set-head 4, such that the rivet shaft 7 passes the set-head end 11 inside the groove segment 14 (FIG. 1). Hence, one break-off groove 13a is always flush with the set-head end 11. The completed formation of the closing head 27 inhibits a further displacement of the rivet shaft 7. The force acting between the mouthpiece 23 and the clamping device 24 therefore increases abruptly to an amount $F_2$.

Figure 5:
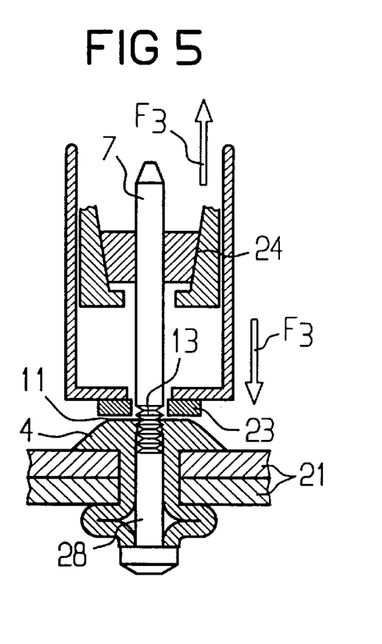
Figure 7:
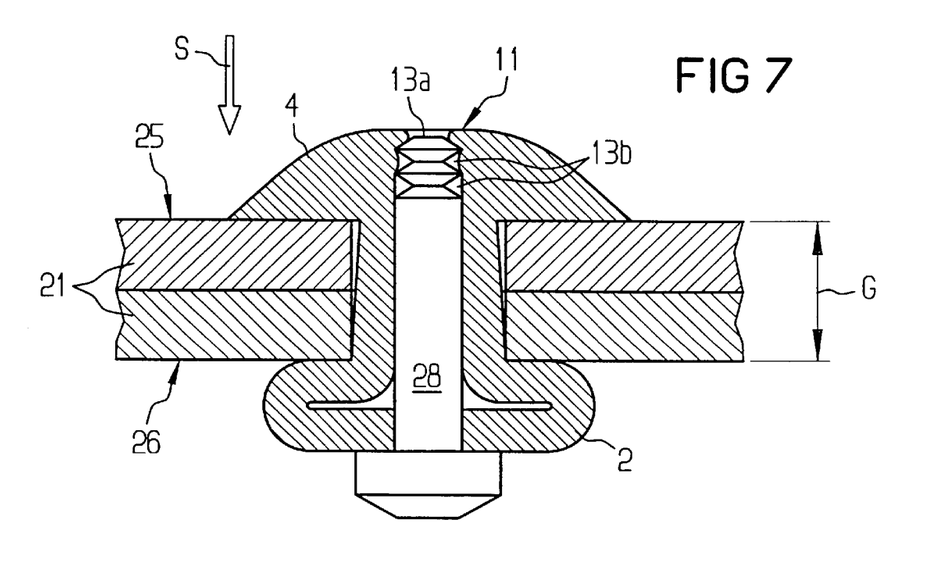

Because of the increased force $F_2$, also referred to as the pressing force, in accordance with FIG. 5, the set-head 4 is now deformed by means of the mouthpiece 23. The deformed set-head material is pressed into the break-off groove 13a ending flush with the set-head end 11, as well as into the break-off grooves 13b (FIG. 7) located behind this break-off groove in the insertion direction S. In this way, the segment of the rivet shaft—referred to hereinafter as the residual shaft 28—located behind the break-off groove 13a in the insertion direction S is effectively relieved of tension. The pressing process in accordance with FIG. 5 is ended when the force acting between the mouthpiece 23 and the clamping device 24 increases further to an amount $F_3$.

Figure 6:
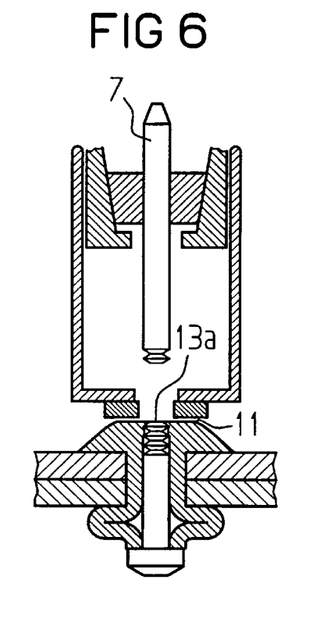

In accordance with FIG. 6, this further increase in force results in the breakage of the rivet shaft 7 at the break-off groove 13a ending flush with the set-head end 11. The complete blind-rivet connection produced in accordance with FIG. 6 is shown on an enlarged scale in FIG. 7. Here it is shown particularly clearly that the residual shaft 28 is in a form-fitting connection with the rivet shank 2 and the set-head 4 on the two sides 25, 26, respectively, of the components 21, and thereby stabilizes the blind-rivet connection in the manner of a tension rod. This break-off grooves 13b act as fixing grooves.

Figure 2:
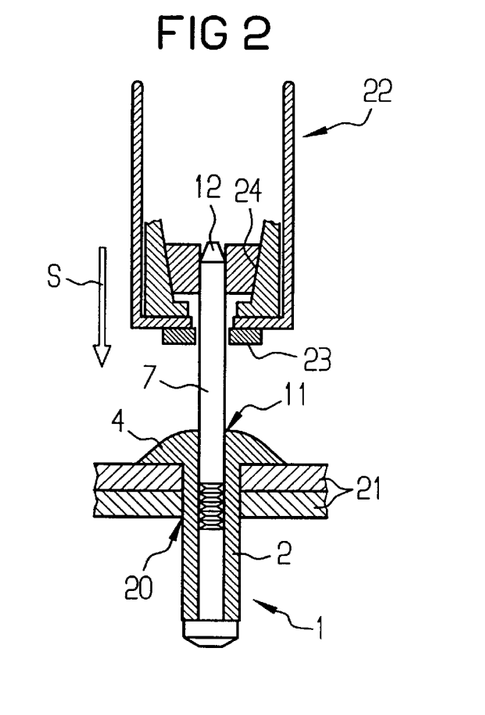
FIGS. 2–6 method steps for producing a blind-rivet connection by means of a blind rivet according to FIG. 1, FIG. 7 an enlarged longitudinal section through a blind-rivet connection produced by means of a blind rivet according to FIG. 1, FIG. 7A in a representation according to FIG. 7, an embodiment of the blind rivet wherein the set head is countersunk flush with the surface of the insertion side component, FIG. 8 a partial view of the blind rivet according to FIG. 1, but with break-off grooves that are increasingly pronounced in the direction of the shaft head, FIG. 9 in a representation according to FIG. 8, an embodiment of the blind rivet with break-off grooves that become increasingly rounded further away from the shaft head, FIG. 10 a break-off groove in a detailed illustration X according to FIG. 9, FIG. 11 in a representation according to FIG. 8, an embodiment of the blind rivet with break-off grooves that become progressively narrow toward the shaft head, FIG. 12 a partial view of a blind rivet having a lip-shaped flow region at its set-head, and a setting tool that is placed against the set-head for producing a blind-rivet connection, FIG. 13 in a representation according to FIG. 9, a blind rivet having a pressing sleeve that is positioned on its set-head, and FIGS. 14 & 15 in a representation according to FIG. 9, the setting machine with a different embodiment of the mouthpiece that impacts the set-head of the blind rivet.
Figure 7A:
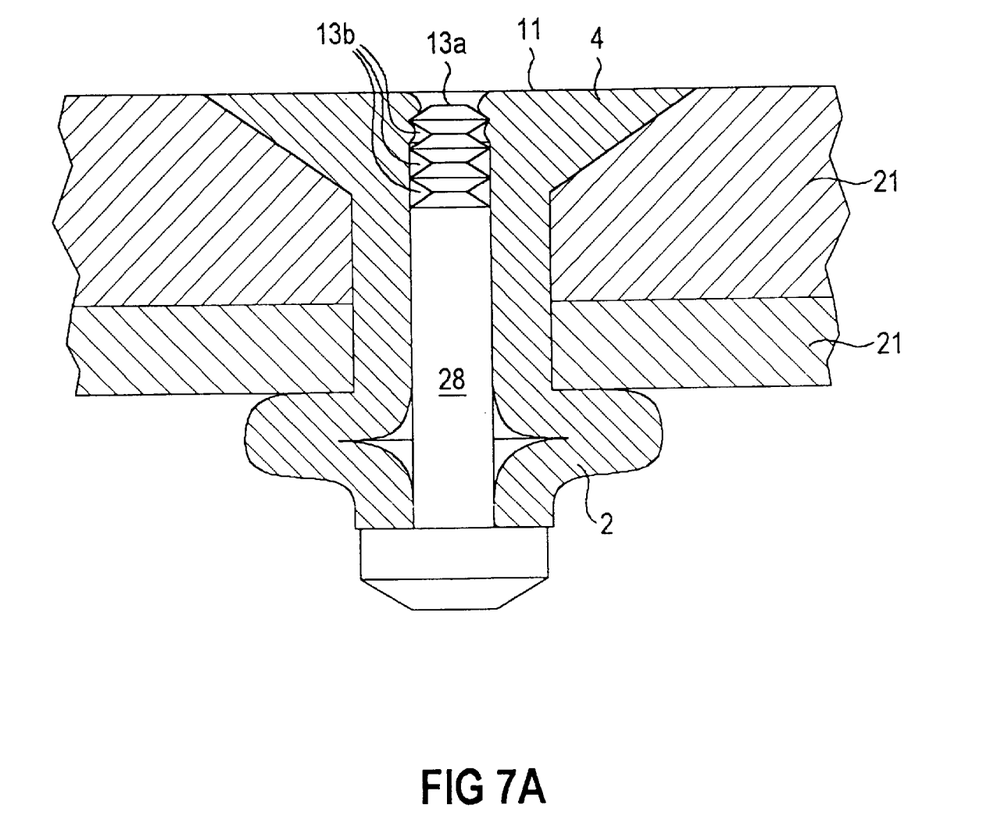

An overview of FIGS. 1 through 7 suggests that the dimensioning of the blind rivet 1 in accordance with FIG. 1 is correlated with the parameters of the method in accordance with FIG. 2. Thus, the axial length of the groove segment 14 and its arrangement relative to the shaft head 8 is determined by the preset minimum and maximum total thickness G of the component 21 and the axial buckling of the rivet shank 2 associated with the formation of the closing head. Furthermore, the ratio of the forces $F_1$, $F_2$ and $F_3$ is a function of the embodiment, that is, the shaping and the material selection, of the rivet shank 2, the set-head end 11 and the break-off grooves 13. The forces $F_1$, $F_2$ and $F_3$ are particularly also used to establish the prestressing acting upon the components 21 through the blind-rivet Connection. In an alternative embodiment according to FIG. 7A, the set head 4 is a counterhead which is countersunk into the insertion side component 21. The countersunk set head 4, therefore, forms a cleaner surface with the exposed face of component 21.

Figure 8:
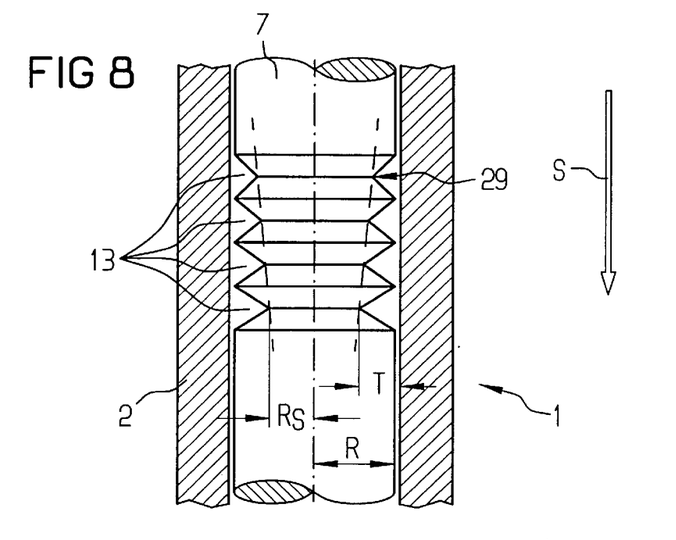

In an advantageous embodiment of the blind rivet 1 in accordance with FIG. 8, the break-off grooves 13 are embodied such that their groove depth T increases in the insertion direction S and therefore in the direction of the shaft head 8 (not shown in FIG. 8). The term groove depth T characterizes the difference between the outer radius R of the rivet shaft 7 and its break-off radius $R_S$ in the angle point 29 of each break-off groove 13. Because of this embodiment of the break-off grooves 13, the force $F_3$ necessary for breaking each break-off groove 13 decreases from break-off groove 13 to break-off groove 13 in the insertion direction S. The last break-off groove 13 in the insertion direction S, that is, the groove next to the shaft head 8, therefore breaks most easily. This prevents a faulty rivet connection in which the residual shaft 23 projects beyond the set-head end 11. The breakage of the rivet shaft 7 is namely always effected at the weakest point—in other words, in the insertion direction S, directly in front of the tension relief produced by the pressed-in set-head material. The weakest point of the rivet shaft 7 is therefore always the break-off groove 13a, which ends flush with the set-head end 11.

Figure 9:
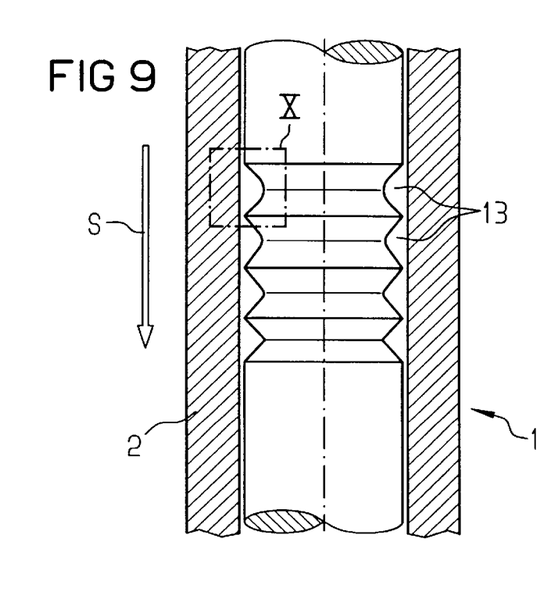
Figure 10:
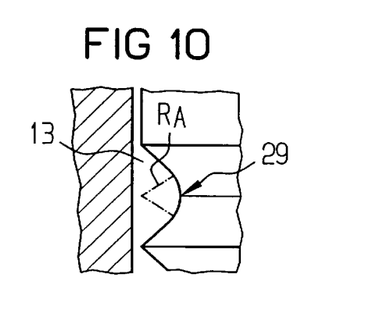
Figure 11:
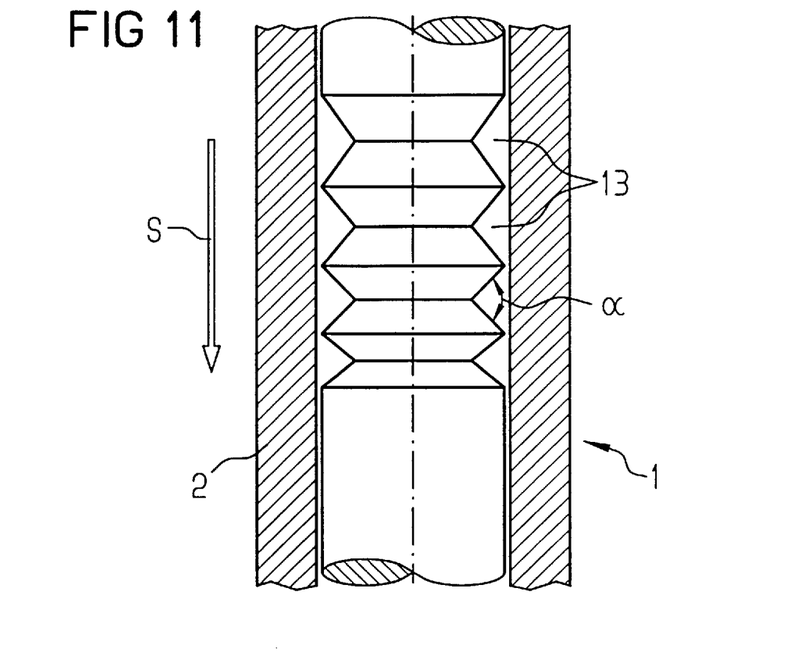

The same effect is achieved in an embodiment of the blind rivet 1 in accordance with FIG. 9. In this instance, the break-off grooves 13 are increasingly sharp-edged in the insertion direction S. In other words, the rounding radius $R_A$ in the angle point 29 of each break-off groove 13 decreases from break-off groove 13 to break-off groove 13 in the insertion direction S, i.e., toward the shaft head 8. The rounding radius $R_A$ can be inferred particularly from the enlarged representation in accordance with FIG. 10. FIG. 11 shows a further embodiment of the blind rivet 1, in which the break-off grooves 13 are progressively weaker toward the shaft head 8. In this embodiment, the opening angle α of the break-off grooves 13 decreases from break-off groove 13 to break-off groove 13 in the insertion direction S. The break-off grooves 13 are therefore increasingly narrower toward the shaft head 8.

Figure 12:
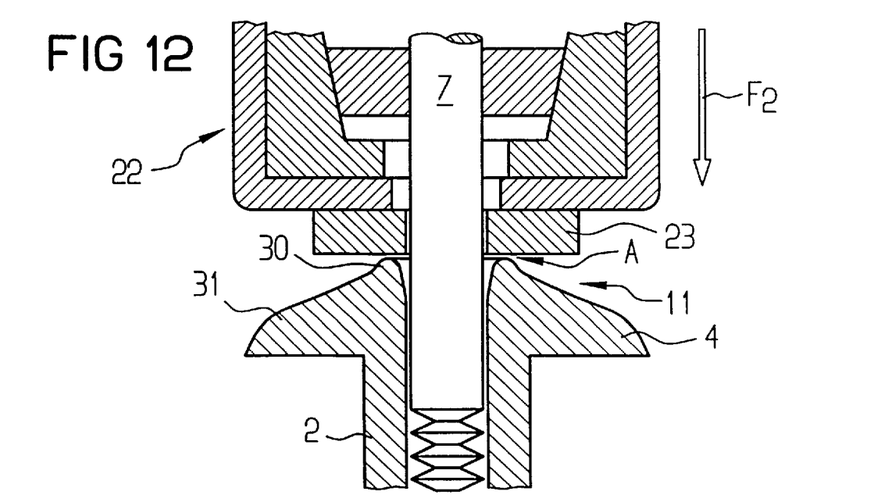

In an embodiment of the blind rivet 1 in accordance with FIG. 12, the set-head end 11 is provided with a flow region 30 in the form of a lip-shaped bulge. As can be seen from FIG. 9, only a small surface region of the flour region 30 is impacted by the mouthpiece 23 of the setting tool 22, and is therefore already deformed with a comparatively small pressing force $F_2$. If the flow region 30 is pressed flat due to the pressing process, the surface of the mouthpiece 23 lies against the wide body 31 of the set-head 4. A further deformation of the set-head material requires a force exceeding the pressing force $F_2$ by a multiple. Such a reshaping of the body 31 does not take place, however, because the rivet shaft 7 breaks off if the force increases to the amount $F_3$. As an alternative or in addition to the illustrated embodiment, the set-head material contained in the flow region 30 can be embodied to be easily deformed in comparison to the material of the body 31. This can be attained, for example, through partial soft-annealing of the set-head end 11.

Figure 13:
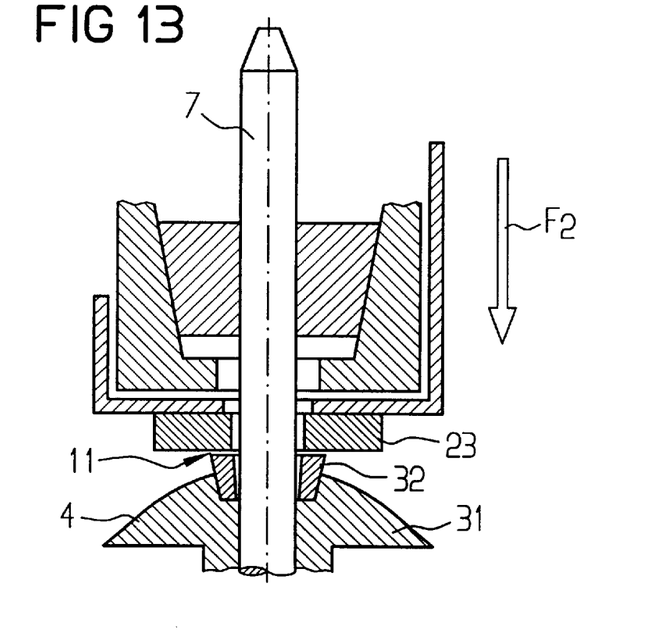

As an alternative to a flow region 30 that is integral with the set-head 4, the set-head material provided for pressing can be contained in a pressing sleeve 32 in accordance with FIG. 13. The frustoconical pressing sleeve 32 encompasses the rivet shaft 7 coaxially, and lies partially in a notch of the body 31 of the set-head 4. The pressing sleeve 32 advisably comprises a material that is easily deformable in comparison to the material of the body 31. After the pressing process, the crushed sleeve 32 provides the form-fit between the rivet shaft 7 and the body 31.

Figure 14:
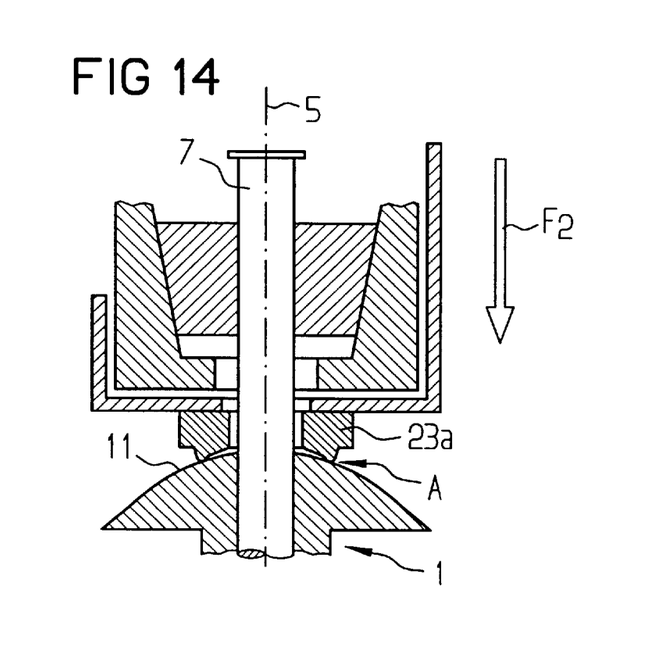

In an advantageous modification of the method, in accordance with FIG. 14, it is also possible to influence the pressing process with respect to the time of the pressing and the quantity of pressed-in set-head material, independently of the embodiment of the blind rivet 1. In this case, the pressing process is influenced by the shape of the mouthpiece 23. In contrast to the level mouthpiece 23 in accordance with FIGS. 2–6, 12 and 13, the mouthpiece 23a shown in FIG. 14 possesses a concave curvature. The arching of the mouthpiece 23a is more sharply curved than the set-head end 11. Analogously to the lip-shaped flow region 30 in accordance with FIG. 12, the mouthpiece 23a only impacts the set-head end 11 in the region of a narrow, annular support surface A, and thus effects a reshaping of the set-head material with a comparatively small pressing force $F_2$.

Figure 15:
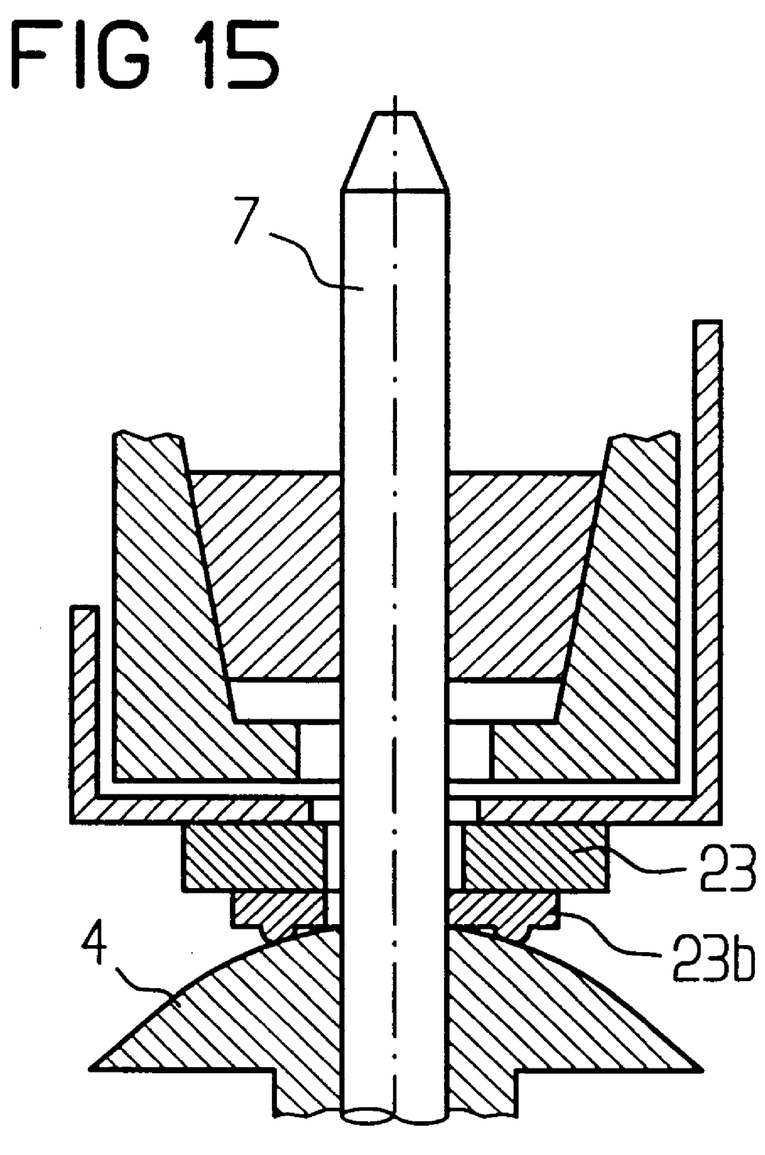

In an embodiment in accordance with FIG. 15, an adapter mouthpiece 23b having a concave arch on its side facing the set-head 4 is placed on a flat mouthpiece 23 in accordance with FIGS. 2–6, 12 and 13. Differently-shaped adapter mouthpieces 23a can be exchanged for one another with little effort. Therefore, it is especially simple to vary the pressing process, and consequently the characteristics of the rivet connection, even in the use of structurally-identical rivets.

What is claimed is:

1. A blind rivet for connecting a plurality of components, comprising:
    a rivet shank including an essentially hollow cylinder having contiguous surfaces, said rivet shank having an inner diameter and an outer diameter and a first end and a second end;
    a rivet shaft penetrating the rivet shank and the set head coaxially and essentially without play;
    an annular set-head fixedly attached to the first end of the rivet shank and having a set-head end remote from the rivet shank and presenting a support surface approximately perpendicular to the rivet shaft, said set-head having an outer diameter greater than that of the outer diameter of the rivet shank and essentially forming with the rivet shank a T-shape in cross section;
    a shaft head fixedly attached to the end of the rivet shaft remote from the set head end of the rivet shank, said shaft head having a diameter that is greater than the inner diameter of the rivet shank; and
    a plurality of break-off groves arranged axially and in series along the rivet shaft, said break off grooves having a depth which constricts the diameter of the rivet shaft, wherein said break-off grooves are disposed on the rivet shaft such that, when the rivet shaft is displaced in a direction of the set-head with respect to an initial position as a result of a riveting process, one break-off groove is essentially flush with the set-head end remote from the rivet shank.

2. The blind rivet according to claim 1, wherein the side of the set-head remote from the shaft head is rounded approximately in the manner of a sphere segment.

3. The blind rivet according to claim 1, wherein the set-head is countersunk in the underlying component material.

4. The blind rivet according to claim 1, wherein the shaft head is dimensionally stable, and rests in a form-fitting connection against the second end of the rivet shank remote from the set-head.

5. The blind rivet according to claim 1, wherein the rivet shaft is not hollow.

6. The blind rivet according to claim 1, wherein the depth of the break-off grooves increases from break-off groove to break-off groove in the direction of the shaft head.

7. The blind rivet according to claim 1, wherein each break-off groove has an outer radius in the apex of the groove, said outer radius decreasing from break-off groove to break-off groove in the direction of the shaft head.

8. The blind rivet according to claim 1, wherein each break-off groove has an opening angle, said opening angle decreasing from break-off groove to break-off groove in the direction of the shaft head.

9. The blind rivet according claim 1, wherein the break-off grooves are disposed on the rivet shaft such that, when the rivet shaft is displaced in the direction of the set-head with respect to its initial position as a result of the riveting process, at least one break-off groove is located inside the set-head.

10. The blind rivet according to claim 1, wherein the set-head further includes a body and a flow region that are embodied in one piece, said flow region being located at the end of the set-head remote from the shaft head and being deformable with a small pressing force in comparison to the body.

11. The blind rivet according to claim 1, wherein the set-head includes a body and an annular pressing sleeve, said pressing sleeve surrounding the rivet shalt coaxially and at least partially lying in a notch of the body remote from the shaft head, the pressing sleeve being deformable with a small pressing force in comparison to the body.

12. A method of producing a blind-rivet connection, comprising:
    a. inserting the shank of a blind rivet into a flush bore of a plurality of components;
    b. placing the mouthpiece of a setting tool against a support surface of the set-head such that the mouthpiece exerts a force on the set-head that acts essentially in the insertion direction;
    c. deforming the end of the rivet shank remote from the set-head into a closing head by impact with a closing head of a rivet shaft that penetrates the rivet shank and is widened into the closing head at the end of the rivet shaft remote from the insertion side of the components, so that the components to be connected are fixed between the closing head and a set-head disposed at the rivet shank on the insertion side;
    d. after the closing head has been formed by means of the mouthpiece, deforming the set-head such that the set-head material is pressed into a break-off groove that is flush with the set-head end or lies inside the set-head; and
    e. separating the rivet shaft projecting beyond the set-head at a distance from the shaft head that is predetermined by a break-off groove, and so that, of the plurality of break-off grooves arranged axially in series on the rivet shaft, the break-off groove that is flush with the set-head end when the closing head is formed is always used as the separating point for the tension segment.

13. The method according to claim 12, further comprising selecting the blind-rivet from among a variety of blind-rivets possessing set heads with different material and geometric characteristics, such that the pressing force and time required to set the rivet can be adapted to the particular objective and components to be joined.

14. The method according to claim 12, further comprising selecting a setting tool mouthpiece from among a variety of mouthpieces possessing different shapes for exerting different forces such that the pressing force required for pressing in the set-head material is set substantially independently of the embodiment of the blind rivet.

15. The method according to claim 12, further comprising prestressing the rivet shaft for locking the rivet shaft between the closing head and the set-head.

* * * * *